United States Patent
Zhang et al.

(10) Patent No.: US 9,450,874 B2
(45) Date of Patent: Sep. 20, 2016

(54) METHOD FOR INTERNET TRAFFIC MANAGEMENT USING A CENTRAL TRAFFIC CONTROLLER

(71) Applicant: Futurewei Technologies, Inc., Plano, TX (US)

(72) Inventors: Shujin Zhang, San Carlos, CA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 307 days.

(21) Appl. No.: 13/802,375

(22) Filed: Mar. 13, 2013

(65) Prior Publication Data

US 2014/0192645 A1 Jul. 10, 2014

Related U.S. Application Data (60) Provisional application No. 61/749,087, filed on Jan. 4, 2013.

(51) Int. Cl.
| | |
|---|---|
| *H04L 1/00* | (2006.01) |
| *H04L 12/801* | (2013.01) |
| *H04L 12/911* | (2013.01) |
| *H04L 12/913* | (2013.01) |
| *H04L 12/725* | (2013.01) |

(52) U.S. Cl.
CPC ............ *H04L 47/12* (2013.01); *H04L 45/302* (2013.01); *H04L 47/724* (2013.01); *H04L 47/726* (2013.01)

(58) Field of Classification Search
None
See application file for complete search history.

(56) References Cited

U.S. PATENT DOCUMENTS

| | | | |
|---|---|---|---|
| 8,416,692 B2 | 4/2013 | Patel et al. | |
| 2007/0230352 A1* | 10/2007 | Kokku et al. | 370/238 |
| 2009/0310509 A1* | 12/2009 | Kumai et al. | 370/254 |
| 2010/0208584 A1* | 8/2010 | Sone et al. | 370/228 |
| 2011/0013644 A1* | 1/2011 | Das | H04L 47/724 370/458 |
| 2011/0019574 A1* | 1/2011 | Malomsoky | H04L 41/5022 370/252 |
| 2013/0003524 A1* | 1/2013 | Huang | H04L 1/1825 370/216 |
| 2013/0007239 A1* | 1/2013 | Agarwal | H04L 63/02 709/223 |
| 2013/0028258 A1* | 1/2013 | Carney | H04L 45/742 370/392 |
| 2013/0058357 A1* | 3/2013 | Koponen et al. | 370/412 |
| 2016/0080256 A1* | 3/2016 | Solomon | H04L 45/50 370/392 |

* cited by examiner

*Primary Examiner* — Jutai Kao
(74) *Attorney, Agent, or Firm* — Conley Rose, P.C.; Grant Rodolph; William H. Dietrich (57) ABSTRACT

A method for internet traffic management, comprising receiving a request for a path set from an application at a network traffic controller, wherein the request contains an intended traffic destination endpoint, evaluating a plurality of network devices in a network, identifying a plurality of paths usable by the application to transmit traffic from the application to the intended traffic destination endpoint, including the plurality of paths in the path set, and sharing the path set with the application.

12 Claims, 4 Drawing Sheets

METHOD FOR INTERNET TRAFFIC MANAGEMENT USING A CENTRAL TRAFFIC CONTROLLER

CROSS-REFERENCE TO RELATED APPLICATIONS

This application claims priority to U.S. Provisional Application No. 61/749,087, filed Jan. 4, 2013, by Shujin Zhang, et al., titled "Method For Internet Traffic Management Using A Central Traffic Controller," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks are comprised of nodes that transport data through the network. The nodes include routers and/or switches that select paths for the individual data as to travel through the network. As used herein, "path" may mean a list of next-hop addresses used by a packet to travel from a source to a destination Internet Protocol (IP) address. When large amounts of data are to be transported from a common source, A, to a common destination, Z, a data path can be established from A to Z. All the data to be transported from A to Z can be mapped to this path. By doing so, the nodes in the path no longer need to determine the path to transport the data packets. Instead, the nodes merely transport the data to the next node in the path, which may improve the efficiency of data transportation. The data is then transported from node to node through the network until the data arrives at the destination node.

Routers commonly establish paths between two end points based on IP addresses at the two end points. Currently, A to Z paths may be built by routing protocols and policies using the "shortest" distance metrics between the source and destination IP addresses, e.g., paths having the fewest number of next-hop addresses. Once a shortest distance path between end points A and Z is determined, all traffic between those end points may be required to follow the same path. Normally, routers do not select the second "shortest" path or third "shortest" path. However, if one source generates comparatively more traffic than another, the path servicing that source may become congested.

One attempt to resolve the congestion problem relies on adding more paths to the source. Since paths may be built by routing protocols and policies based on destination IP addresses, this approach may be limited by the routing protocols and algorithms.

In another attempt to resolve the congestion problem, each IP device makes its own path selection decisions using the destination IP address based on the agreement with other devices. In such a solution, the path may be determined before the packet leaves the source, tying together path creation and packet forwarding. This may lead to a variety of difficulties, including (i) a node may not make a forwarding decision without the agreement of all of the other nodes; (ii) there may not be a way to use other paths when the shortest path is congested; (iii) it may not be possible to have many paths and to simultaneously use these paths arbitrarily, e.g., because Equal-Cost Multi-Path (ECMP) routing requires all paths be identical; and (vi) an application may not have much influence on forwarding decision since its IP may have already determined the path.

In still another attempt to resolve the congestion problem, every network device may store all the available paths to a destination. In this solution, each device may check path conditions and select a path based on the results. This solution may present two problems: (i) this may place an impractical amount of data in the devices; and (ii) checking path conditions during forwarding may demand an impractical amount of processing for the devices.

SUMMARY

In one aspect, the disclosure includes a method for internet traffic management, comprising receiving a request for a path set from an application at a network traffic controller, wherein the request contains an intended traffic destination endpoint, evaluating a plurality of network devices in a network, identifying a plurality of paths usable by the application to transmit traffic from the application to the intended traffic destination endpoint, including the plurality of paths in the path set, and sharing the path set with the application.

In another aspect, the disclosure includes an apparatus comprising a processor configured to request a path set from a network traffic controller, receive the path set from the network traffic controller, wherein the path set comprises a plurality of paths from the application to a predefined destination, select a path from the path set, and send traffic to the predefined destination using the selected path.

In yet another aspect, the disclosure includes a computer program product comprising computer executable instructions stored on a non-transitory medium that when executed by a processor cause the processor to assess the capabilities of a network, select a plurality of network devices from the network map for inclusion in a path, select a plurality of paths for inclusion in a network view, create a network view, and share the network view with at least one application.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The disclosure includes using centralized network traffic controller paradigm to make high-level traffic control decisions while retaining some level of individual application control of traffic routing. As used herein, the term "path" may mean a unit of network resource, and may have prescribed properties, e.g., bandwidth, latency, jitter, and packet loss. A centralized traffic controller, e.g., an SDN controller, may have global knowledge both of network nodes and all of the paths between the nodes. Applications may create paths using this central traffic controller, which will be aware of the global path conditions, and may query the central traffic controller for the optimal path. Application requests may include certain performance specifications, e.g., service requirements, e.g., Wide Access Network (WAN) Application Acceleration Service (WaaS), caching service, reliability, etc. Applications may query the central traffic controller initially and/or at periodic intervals, including during the course of a single transmission of traffic. Consequently, as will be evident to those of ordinary skill, the "shortest distance" metrics, i.e., the fewest number of next-hop addresses, may not be the sole criteria used by the central traffic controller when determining optimal path, but rather the optimal path calculation metrics may include a variety of network performance information, e.g., avoiding congested areas, minimizing packet loss, etc., depending on the needs of the application.

Figure 1:
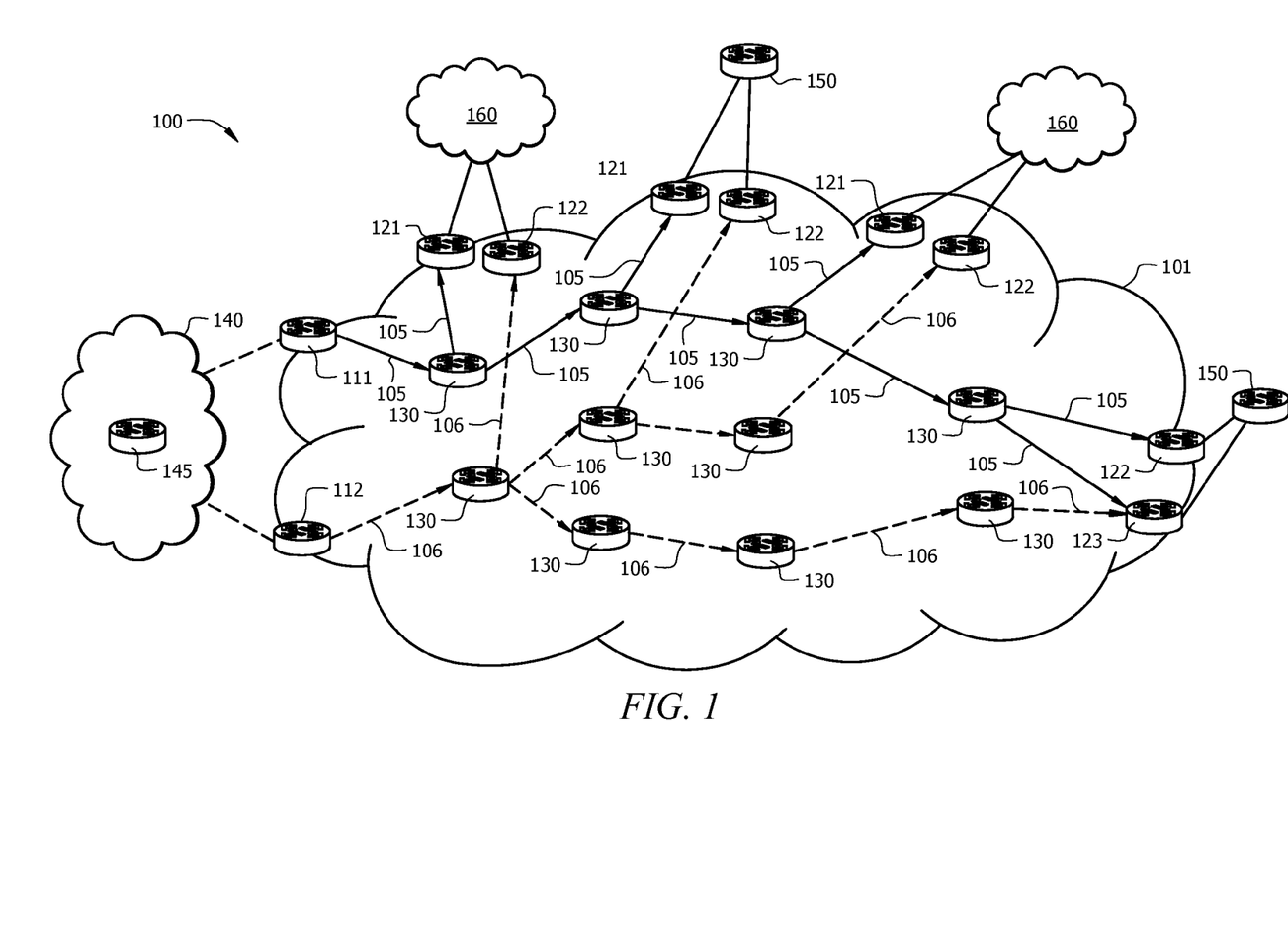
FIG. 1 is a schematic of one example embodiment of a label switched system.

FIG. 1 is a schematic of one example embodiment of a label switched system 100, where a plurality of Point to Point (P2P) Label-Switched Paths (LSPs) and Point to Multi-Point (P2MP) LSPs may be established between at least some of the components. The P2P LSPs and P2MP LSPs may be used to transport data traffic, e.g., using packets and packet labels for routing. The label switched system 100 may comprise a label switched network 101, which may be a packet switched network that transports data traffic using packets or frames along network paths or routes. The packets may route or switch along the paths, which may be established using a label switching protocol, such as Multiprotocol Label Switching (MPLS) or generalized MPLS (GMPLS).

The label switched network 101 may comprise a plurality of edge nodes, including a first ingress node 111, a second ingress node 112, a plurality of first egress nodes 121, and a plurality of second egress nodes 122. When a P2MP LSP in the label switched network 101 comprises at least some of the edge nodes, the first ingress node 111 and second ingress node 112 may be referred to as root nodes, and the first egress nodes 121 and second egress nodes 122 may be referred to as leaf nodes. Additionally, the label switched network 101 may comprise a plurality of internal nodes 130, which may communicate with one another and with the edge nodes.

The first ingress node 111 and the second ingress node 112 may communicate with a source node 145 at a first external network 140, such as an Internet Protocol (IP) network, which may be coupled to the label switched network 101. As such, the first ingress node 111 and the second ingress node 112 may transport data, e.g., data packets, between the label switch network 101 and the external network 140. In some embodiments, the data transported may comprise data associated with inter-application communication. In other embodiments, the data transported may comprise control signals. In still other embodiments, this data may comprise both control signals and inter-application communications. In embodiments wherein the data comprises control signals, this data may pass through an intermediary central traffic controller or network controller (not pictured), e.g., a SDN controller, that may further comprise a network operating system (NOS) for controlling one or more internal nodes of switched network 101. Further, some of the first egress nodes 121 and second egress nodes 122 may be grouped in pairs, where each pair may be coupled to a second external network or a client.

In an example embodiment, the edge nodes and internal nodes 130 may be any devices or components that support transportation of the packets through the label switched network 101. For example, the network nodes may include switches, routers, servers, or various combinations of such devices. The network nodes may receive packets from other network nodes, determine which network nodes to send the packets to, and transmit the packets to the other network nodes. In some embodiments, at least some of the network nodes may be Label Switch Routers (LSRs), which may be configured to modify or update the labels of the packets transported in the label switched network 101. Further, at least some of the edge nodes may be label edge routers (LERs), which may be configured to insert or remove the labels of the packets transported between the label switched network 101 and the external network 140.

The label switched network 101 may comprise a first P2MP LSP 105, which may be established to multicast data traffic from the first external network 140 to the destination nodes 150 or other networks 160. The first P2MP LSP 105 may comprise the first ingress node 111 and at least some of the first egress nodes 121. The first P2MP LSP 105 is shown using solid arrow lines in FIG. 1. To protect the first P2MP LSP 105 against link or node failures, the label switched network 101 may comprise a second P2MP LSP 106, which may comprise the second ingress node 112 and at least some of the second egress nodes 122. The second P2MP LSP 106 is shown using dashed arrow lines in FIG. 1. Each second egress node 122 may be paired with a first egress node 121 of the first P2MP LSP 105. The second P2MP LSP 106 may also comprise some of the same or completely different internal nodes 130. The second P2MP LSP 106 may provide a backup path to the first P2MP LSP 105 and may be used to forward traffic from the first external network 140 to the first P2MP LSP 105 or second P2MP LSP 106, e.g., to egress node 123, when a network component of P2MP LSP 105 fails.

Figure 2:
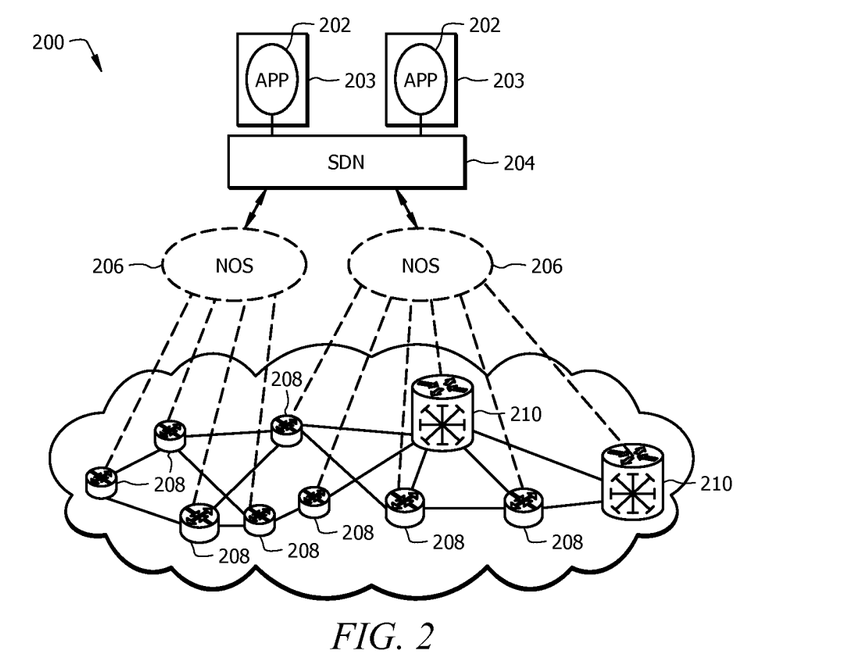
FIG. 2 illustrates an embodiment of a Software-Defined Network (SDN) architecture.

FIG. 2 illustrates an embodiment of an SDN architecture 200. SDNs decouple network control from forwarding and are directly programmable, e.g., by separating the control plane from the data plane and implementing the control plane using software applications and a centralized traffic controller and/or network controller which may make routing decisions and communicate these decisions to devices on the network. SDN architectures may be divided into multiple logical layers: networking devices (e.g., routers, switches, servers, etc.), NOSs, SDN controllers, and user applications. SDN controllers may be software modules built over NOS in network systems, e.g., network 100 of FIG. 1, and may provide platforms for users to write applications and services via Application Programming Interfaces (APIs). SDN controllers may be responsible for creating network maps and network views. As used herein, the term "network map" may mean a virtual representation of the underlying network topology, state information, dynamic traffic flow/volume information, and/or other network state information stored in a computer memory, and may include the real-world capabilities of the underlying network nodes, e.g., bandwidth, latency, port capability, jitter, etc., as well as the real-world links between the network nodes. As used herein, the term "network view" may mean a logical representation of at least a portion of a whole network map, e.g., a subnet, stored on a computer memory and transmittable between devices, e.g., an SDN controller and an application running on a computer device. The network views may be represented based on multiple layer virtualized SDNs.

In FIG. 2, applications 202, e.g., software programs, hosted on sources or devices 203, e.g., video servers or the source node 145 of FIG. 1, may communicate with a central traffic controller or network controller 204, e.g., an SDN controller, through SDN API connections facing the applications 202. The central traffic controller 204 may be configured to perform control path and/or control plane functionality, such as drawing a "network map" and defining the information in a routing table that defines what to do with incoming packets. The central traffic controller 204 may be configured for management and control functionality of the control plane, which may include routing and resource management. The central traffic controller 204 may include SDN management software modules (not depicted), and may communicate with lower layer NOSs 206. NOSs 206 may be hosted on the same device as the central traffic controller 204 or a different device, and may monitor and control the underlying network components 208 and 210, e.g., internal nodes 130 of FIG. 1, which may separately be any components configured to receive and/or transmit data through the data network. The control path is represented by dashed lines and the data path is represented by solid lines. The NOSs 206 may provide an abstraction layer between decision devices 208 and forwarding devices 210 on one side and the central traffic controller 204 on the other, may be coupled to the decision devices 208 and forwarding devices 210, and may communicate with the decision devices 208 and forwarding devices 210, e.g., via OpenFlow defined protocols on OpenFlow controllers. The NOSs 206 may possess comprehensive topology knowledge and resource information with respect to the underlying decision devices 208. The NOSs 206 may pass this information to the central traffic controller 204, which may be maintained by the central traffic controller 204 as a network map. With a network map, the central traffic controller 204 may make decisions on how to assign resources and route different application/information flows through the SDN architecture 200.

In some embodiments, forwarding devices 210 may only process the outer address of a packet embodiment (described below) in accordance with this disclosure. The decision devices 208 may function as "decision nodes". Decisions nodes may possess a cache storing one or more provider addresses or an address at which a content host may be reached to provide specified content. Upon receipt of a packet from an application, the decision node may check whether a cache entry contains one or more provider addresses associated with the data requested in the packet to which the packet may be routed. If so, the decision node may route the packet to a selected provider address, e.g., by adding a packet header to the original packet from the application and forwarding the packet, based on a well-defined rule. If not, the decision node may ask the central traffic controller 204 for provider addresses and may update its cache upon receipt thereof. When a second decision node receives a packet from a first decision node, the second decision node may remove the packet header and deliver the packet to the application(s) using the original packet header address.

Figure 3:
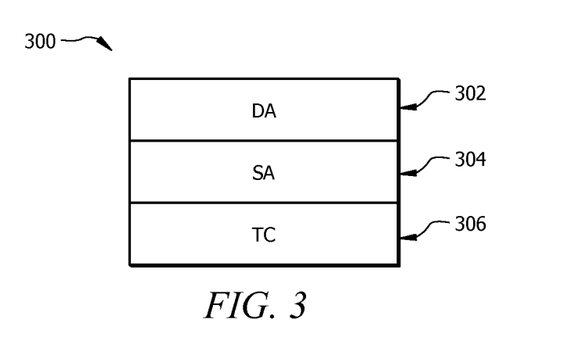
FIG. 3 illustrates certain elements that may be added to the header of a data packet.

FIG. 3 illustrates certain elements 300 which may be added to the header of a data packet, e.g., an IP packet, MPLS packet, Ethernet frame, etc., transmitted from one endpoint, e.g., application 202 of FIG. 2, to another endpoint, e.g., egress node 122 of FIG. 1. Selecting different paths for packet transmissions using the methods disclosed herein may require adding one or more of these elements to distinguish between traffic from different applications. The disclosed elements may include a destination address field 302, a source address field 304, and a traffic classifier field 306. The destination address field 302 may be populated with the intended endpoint destination address of the packet. The source address field 304 may be populated with the address of the packet-originating endpoint. The traffic classifier field 306 may be populated with an application-specific identifier, e.g., a 128 bit number, which identifier may be provided to the application by a network service provider, e.g., central traffic controller 204 of FIG. 2.

Figure 4:
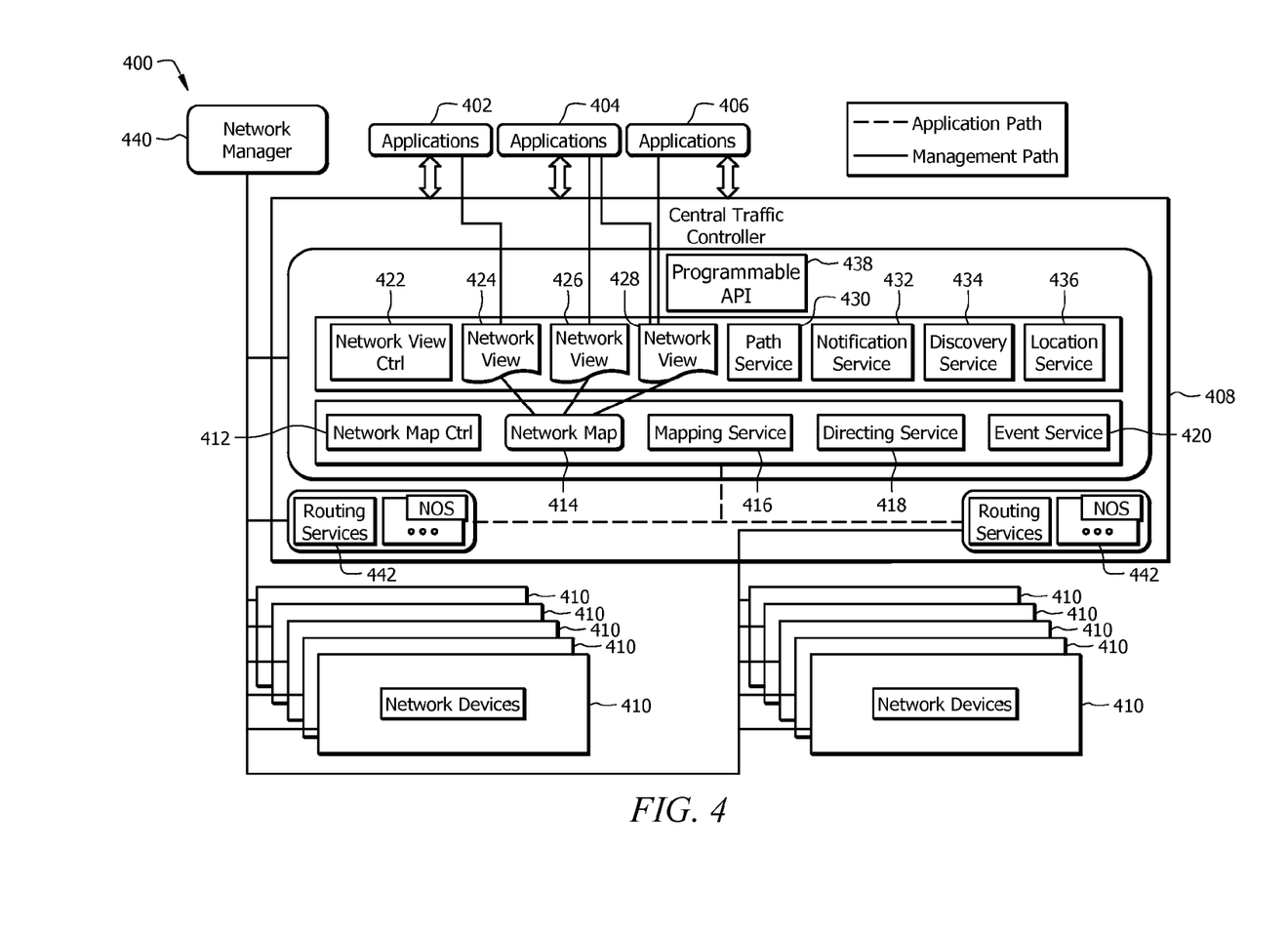
FIG. 4 is an illustration of still another embodiment of an SDN architecture.

FIG. 4 is an illustration of still another embodiment of an SDN architecture 400, e.g., SDN architecture 200 of FIG. 2. FIG. 4 shows applications 402-406, e.g., applications 202 of FIG. 2, in communication with a central traffic controller 408, e.g., central traffic controller 204 of FIG. 2. The central traffic controller 408 may be in communication with network devices 410, e.g., network components 208 and/or forwarding devices 210 of FIG. 2.

The central traffic controller 408 may comprise a Network Map Controller 412, which may be responsible for identifying and storing the global network topology in a network map. The Network Map Controller 412 may comprise a Network Map Element 414, a Mapping Services Element 416, a Directing Services Element 418, and an Event Services Element 420. Network Map Element 414 may store the network map. Mapping Services Element 416 may receive input from the network devices for dynamically updating the network map, e.g., adding a new node to the physical network topology stored in Network Map Element 414. Directing Services Element 418, which may be provided by a NOS, e.g., NOS 206 of FIG. 2, may let applications 402-406 directly setup forwarding path, e.g., by allowing the applications 402-406 to make routing decisions rather than the routing protocol. Event Services Element 420 may monitor the function of one or more network links and/or devices and may inform the Network Map Controller 412 of event-based changes, e.g., a failed link or component, which may trigger a dynamic update to the network map.

The central traffic controller 408 may further comprise a Network View Controller 422, which may be responsible for selecting network views to serve to applications 402-406. The Network View Controller 422 may comprise a Network View Element 424, a Network View Element 426, a Network View Element 428, a Path Services Element 430, a Notification Services Element 432, a Discovery Services Element 434, and a Location Services Element 436. Network View Elements 424-428 may store sets of paths, i.e., path sets, and/or discrete network views comprising at least a portion of the network map topology from Network Map Element 414 and may be in communication with Applications 402-406, e.g., via a programmable API or Controller Interface 438, which may be an interface engine for exchanging data between, e.g., APIs at applications 402-406 and the Network View Elements 424-428. As shown in FIG. 4, a single network view stored at a Network View Element, e.g., Network View Element 424, may service a single application, e.g., application 402. Similarly, a single application, e.g., application 404, may have access to network views stored at multiple Network View Elements, e.g., Network View Elements 426 and 428. In like manner, a single network view stored at a single Network View Element, e.g., Network View Element 428, may service multiple applications, e.g., applications 404 and 406. The Network View Controller 422 may manage this sharing. The sharing of network views by multiple applications or multiple applications sharing the same network view may optionally be visible to the applications that are using them separately, e.g., using Virtual Local Area Network (VLAN) or Virtual Private Network (VPN) techniques according to network configurations. The connections between Network View Elements 424-428 and applications 402-406 are illustrative of the interactions permissible and are not limiting, as would be understood by one of skill in the art. Path Services Element 430 may be responsible for identifying one or more available paths between devices on the physical network and passing the information to the Network View Controller 422 so that appropriate network views may be selected for the requesting application. Notification Services Element 432 may be responsible for interfacing with the applications 402-406 to inform the applications 402-406 of events and/or changes in the relevant network view(s) and/or underlying physical network, e.g., by dynamically updating the network view(s). Discovery Services Element 434 may be responsible for identifying services that the network may provide in the network view. Location Services Element 436 may be responsible for finding the service location and one or more preferred paths for reaching the service location.

Returning to network maps, a network map and/or network topology may be a complete representation of the physical network managed under the Network Map Controller 412 e.g., comprising network components 208 and/or forwarding devices 210 of FIG. 2. Network maps may include communication links, bandwidth, latency, port capability, etc., of the physical network, e.g., network components 208 and/or forwarding devices 210 of FIG. 2. Network maps may comprise nodes representing the physical devices and links representing the connections between the physical devices. Nodes may be direct maps of nodes or may be representations of, e.g., a subnet in a map. Each node may have a node name assigned by the Network View Controller 422 or, in some embodiments, by querying a policy database where names may be defined by a Network Manager 440. Network Manager 440 may be a program for providing detection and configuration for systems to automatically connect to network, as well known in the art. Links may be direct maps of paths between nodes, may be tunnels, e.g., virtual links, between nodes, or may be abstractions of logical paths between nodes. Links may represent multiple parallel connections between nodes, and may be represented by the link's attributes or capabilities. The central traffic controller 408 may further comprise an element for Routing Services 442 for interfacing with the network, e.g., network devices 410, which element may comprise a Universal Message Object (UMO) API.

Network View Elements 424-428 may comprise select portions of the global network map, e.g., as apportioned by the Network View Controller 422. The Network View Controller 422 may ensure that the Network View Elements 424-428 are compatible with the requests of the applications 402-406. For example, if a link in a network view is a virtual link over multiple network nodes, e.g., a tunnel or abstraction of a logical path between network nodes, the Network View Controller 422 may ensure that the virtual link does not include any loops. Network View Elements 424-428 may include node and link capabilities. Node capability may be the physical routing device's capability as monitored by, e.g., Mapping Services Element 416, or may be any abstract capability defined by the map and Network View Controller 422. Link capability may be physical link's capability as monitored by, e.g., Mapping Services Element 416, or may be any abstract capability defined by the map and Network View Controller 422. Link capability may be a direct mapping of the link capability if it may be a direct mapping of a link in a map. Link capability may be a tunnel capability that may be the minimum of all capabilities between two nodes. Link capability may be a combination of multiple parallel connections between nodes, equal to, or less than, the summation of the combined link capabilities. Link capability may be classified or reclassified by the Network View Controller 422 based on the application's 402-406 request and/or current network map status. For example, if a network map link has a 10 gigabit (G) bandwidth capacity, the mapped link in view may be 2G or 8G, etc. depending on, e.g., actual conditions in the network, etc. If a link has a latency of 1 millisecond (ms), e.g., the mapped link in the network view passed to the application may have 2 ms according to Network View Controller 422.

Network View Elements 424-428 may be created at the request of any application 402-406. Requests from applications 402-406 may provide some special requirements on the network view, e.g., minimum capabilities of the nodes and/or links. Network View Controller 422 may create the network view according to such requirements coupled with the currently available resources. Network View Controller 422 may assign a network view ID to newly created network views and may allocate system resources to the view, e.g., Network View Elements 424-428. If the application places no special requirement on the requested network view, Network View Controller 422 may create a network view based on currently available network resources and default management policies. Once created, the Network View Controller 422 may return the view to application. When the application no longer requires the view, it may request that the Network View Controller 422 destroy the network view. Network View Controller 422 may then reclaim all network resources allocated to the network view. In embodiments with isolated network view sharing, isolated network views may form complete sub-network systems permitting additional functionality, e.g., users may build network management and control modules in such network views.

Further information concerning network map and network view architectures in SDNs may be found in U.S. patent application Ser. No. 13/802,297 titled "Methods of Representing Software Defined Networking-Based Multiple Layer Network Topology Views," which application is incorporated herein by reference.

Figure 5:
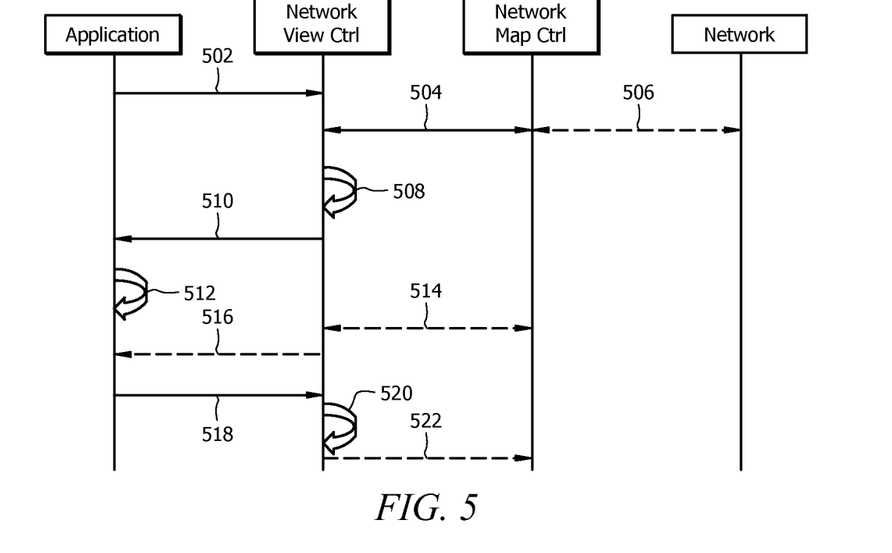
FIG. 5 is a protocol diagram describing a process of creation, maintenance, and destruction of a network view in an embodiment of an SDN architecture.

FIG. 5 is a protocol diagram describing a process of creation, maintenance, and destruction of a network view in an embodiment of an SDN architecture, e.g., SDN architecture 400 of FIG. 4. In FIG. 5, solid lines show steps which may occur in every instance of this embodiment, while dashed lines show steps which may conditionally or optionally occur. At 502, an application, e.g., applications 402-406 of FIG. 4, may request a network view with certain pre-defined constraints, e.g., minimum 5G bandwidth, from a network view controller, e.g., Network View Controller 422 of FIG. 4, at a central traffic controller, e.g., central traffic controller 408 of FIG. 4, via a controller interface, e.g., Controller Interface 438 of FIG. 4. Upon receiving the request, at 504 the network view controller may review a network map controlled by a network map controller, e.g., Network Map Controller 412 of FIG. 4. Dashed line 506 illustrates that network map controller may continuously or periodically monitor the network, e.g., network devices 402B of FIG. 4, underlying the network map, e.g., using elements for mapping services, directing services, and event services, e.g., Mapping Services Element 416, Directing Services Element 418, and Event Services Element 420 of FIG. 4, and may continuously or periodically update the network map based on the results of the monitoring. At 508, the network view controller may create a network view conforming to the requirements of the application and store the network view at a network view element, e.g., Network View Element 424 of FIG. 4. At 510, a central traffic controller, e.g., central traffic controller 408 of FIG. 4, may share the network view with the application, and at 512 the application may utilize the network view to determine its own traffic routing. At 514, the network view controller may continuously or periodically monitor the network map for one or more associated metrics, e.g., bandwidth, latency, port capability, new devices, failed links, etc., using, e.g., path services, notification services, discovery services, and location services, e.g., Path Services Element 430, Notification Services Element 432, Discovery Services Element 434, and Location Services Element 436 of FIG. 4, and may dynamically update one or more network views accordingly. At 516, the one or more updated network views may be shared with applications continuously, periodically, or on an as-needed basis. The application may utilize this information to send data, e.g., using data packets having one or more of the packet header data elements of FIG. 3. At 518, the application may inform the central traffic controller that the network view is no longer required. At 520, the central traffic controller may delete the network view and, at 522, the central traffic controller may reevaluate the path set network device resources returned to the network map to determine whether an update to one or more additional network views is required.

As will be understood by those of skill in the art, alternate embodiments may pass greater or lesser amounts of information to applications. Some embodiments may pass simple path information, while others may pass whole network maps. Modifications to the present disclosure to suitably achieve the same objective while maximizing resource utilization will be apparent and are within the scope of the present disclosure.

Figure 6:
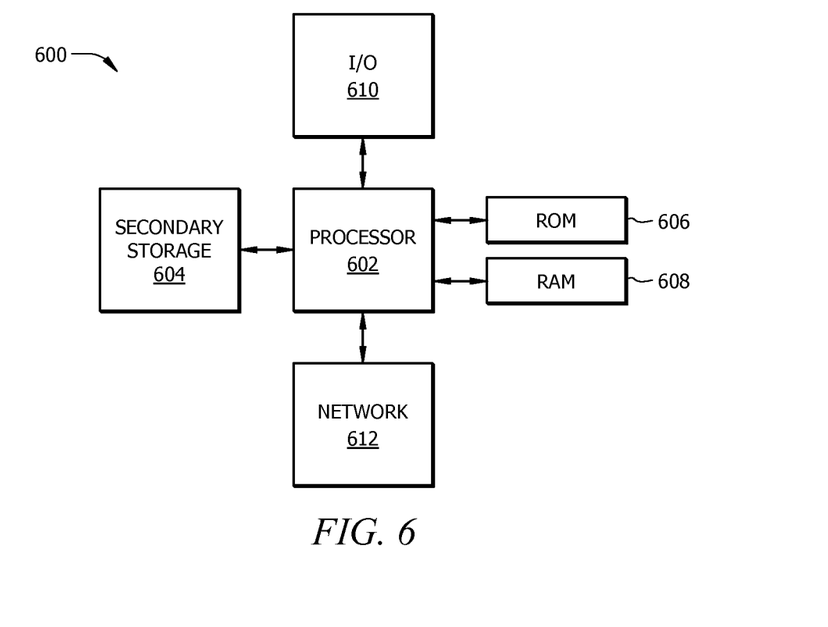
FIG. 6 illustrates a typical, general-purpose network component.

At least some of the features/methods described in the disclosure may be implemented in a general computing device and/or a network apparatus or component, such as a computer or network component with sufficient processing power, memory resources, and network throughput capability to handle the necessary workload placed upon it. For instance, the features/methods of the disclosure may be implemented using hardware, firmware, and/or software installed to run on hardware. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, e.g., cameras, microphones, display screens, etc., and network connectivity devices 612.

The processor 602 may be implemented as one or more CPU chips, or may be part of one or more application specific integrated circuits (ASICs) and/or digital signal processors (DSPs).

The secondary storage 604 is typically comprised of one or more disk drives or erasable programmable ROM (EPROM) and is used for non-volatile storage of data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

It is understood that by programming and/or loading executable instructions onto the general computing device 600, at least one of the processor 602, the ROM 606, and the RAM 608 are changed, transforming the general computing device 600 in part into a particular machine or apparatus, e.g., a video codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for internet traffic management, comprising:
receiving a request for a path set from an application at a network traffic controller, wherein the request contains an intended traffic source, an intended traffic destination endpoint, and requested network capability requirements indicating network devices along paths in the path set provide a Wide Access Network (WAN) Application Acceleration Service (WaaS);
evaluating a plurality of network devices in a network;
identifying a plurality of paths between the intended traffic source and the intended traffic destination endpoint where all the network devices along each path comprise WaaS to meet the requested network capability requirements rendering the paths usable by the application to transmit traffic from the application to the intended traffic destination endpoint;
allocating network device resources along the plurality of paths that comprise WaaS to meet the requested network capability requirements to a path set in a network view; and
sharing the network view comprising the path set with the application.

2. The method of claim 1, wherein the requested network capability requirements further comprise a port capability or a caching service.

3. The method of claim 2, wherein identifying the plurality of paths does not include selection based on fewest number of next-hop addresses between the intended traffic source and the intended traffic destination endpoint.

4. The method of claim 1, further comprising:
monitoring the network devices; and
dynamically updating the path set based on changes in the network devices.

5. The method of claim 1, further comprising:
receiving a notification that the path set is no longer needed by the application;
deallocating the network device resources in the path set; and
reevaluating the plurality of network devices based on the deallocated network device resources.

6. The method of claim 1, wherein the transmitted traffic comprises a header comprising a traffic classifier field with an application specific identifier for distinguishing the traffic from other traffic sent from other applications.

7. A computer program product comprising computer executable instructions stored on a non-transitory medium that when executed by a processor cause the processor to perform the following:
receive a request from an application for a network view of network devices meeting a specified resource requirement between a specified source and a specified destination, wherein the specified resource requirement indicates network devices between the source and the destination provide a caching service;
review a network map of network devices positioned along paths between the source and the destination that provide the caching service to meet the specified resource requirement;
create a network view of the network map, the network view comprising allocated resources of network devices along the paths that provide the caching service to meet the specified resource requirement; and
share the network view with the requesting application.

8. The computer program product of claim 7, wherein the instructions further cause the processor to:
monitor the network; and
update the network view based on changes to the network.

9. The computer program product of claim 7, wherein network devices are not selected for inclusion in the network view based on a fewest number of next-hop addresses between the specified source and the specified destination.

10. The computer program product of claim 5, wherein the specified resource requirement further comprises a Wide Access Network (WAN) Application Acceleration Service (WaaS) or a caching service.

11. The computer program of claim 7, wherein the network is a Software Defined Network (SDN)-based multiple layer network, wherein the network traffic controller is a central traffic controller, and wherein the instructions further cause the processor to:
receive a notification that the network view is no longer required;
release to the network resources allocated to the network view; and
reevaluate a second network view based on the resources released from the network view.

12. The computer program of claim 7, wherein traffic sent via the allocated resources comprises a header comprising a traffic classifier field with an application specific identifier for distinguishing the traffic from other traffic sent from other applications.

* * * * *

UNITED STATES PATENT AND TRADEMARK OFFICE
CERTIFICATE OF CORRECTION

PATENT NO. : 9,450,874 B2  
APPLICATION NO. : 13/802375  
DATED : September 20, 2016  
INVENTOR(S) : Zhang et al.

Page 1 of 1

It is certified that error appears in the above-identified patent and that said Letters Patent is hereby corrected as shown below:

In the Claims

Column 12; Line 47; Claim 10 should read:

10. The computer program product of claim 7, wherein the specified resource requirement further comprises a Wide Access Network (WAN) Application Acceleration Service (WaaS) or a caching service.

Signed and Sealed this  
Third Day of January, 2017

Michelle K. Lee  
*Director of the United States Patent and Trademark Office*